United States Patent
Sallam

(10) Patent No.: US 8,108,937 B1
(45) Date of Patent: Jan. 31, 2012

(54) ROBUSTLY REGULATING ACCESS TO EXECUTABLE CLASS REGISTRY ENTRIES

(75) Inventor: Ahmed Sallam, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 2405 days.

(21) Appl. No.: 10/832,788

(22) Filed: Apr. 26, 2004

(51) Int. Cl.
G06F 1/24 (2006.01)

(52) U.S. Cl. .................. 726/27; 726/30; 726/1

(58) Field of Classification Search .......... None
See application file for complete search history.

(56) References Cited

U.S. PATENT DOCUMENTS

| | | |
|---|---|---|
| 4,776,537 A | 10/1988 | Garside et al. |
| 4,888,798 A | 12/1989 | Earnest |
| 5,050,212 A | 9/1991 | Dyson |
| 5,103,476 A | 4/1992 | Waite et al. |
| 5,182,770 A | 1/1993 | Medveczky et al. |
| 5,432,851 A | 7/1995 | Scheidt et al. |
| 5,450,576 A | 9/1995 | Kennedy |
| 5,530,757 A | 6/1996 | Krawczyk |
| 5,548,532 A | 8/1996 | Menand et al. |
| 5,564,054 A | 10/1996 | Bramnick et al. |
| 5,596,711 A | 1/1997 | Burckhartt et al. |
| 5,606,609 A | 2/1997 | Houser et al. |
| 5,625,693 A | 4/1997 | Rohatgi et al. |
| 5,661,848 A | 8/1997 | Bonke et al. |
| 5,708,776 A | 1/1998 | Kikinis |
| 5,765,151 A | 6/1998 | Senator |
| 5,799,088 A | 8/1998 | Raike |
| 5,802,080 A | 9/1998 | Westby |
| 5,854,759 A | 12/1998 | Kaliski, Jr. et al. |
| 5,922,072 A | 7/1999 | Hutchinson et al. |
| 5,925,126 A * | 7/1999 | Hsieh ............... 726/19 |
| 5,956,475 A | 9/1999 | Burckhartt et al. |
| 5,974,546 A | 10/1999 | Anderson |
| 5,974,549 A * | 10/1999 | Golan ............... 726/23 |
| 6,000,032 A | 12/1999 | Millard |
| 6,014,744 A | 1/2000 | McKaughan et al. |
| 6,014,767 A | 1/2000 | Glaise |
| 6,048,090 A | 4/2000 | Zook |
| 6,061,788 A | 5/2000 | Reynaud et al. |
| 6,079,016 A | 6/2000 | Park |
| 6,088,803 A | 7/2000 | Tso et al. |

(Continued)

FOREIGN PATENT DOCUMENTS

EP 0858031 A1 8/1998

(Continued)

OTHER PUBLICATIONS

Richter, J., Microsoft.com web pages (online). "Design a Windows NT Service to Exploit Special Operating System Facilities", Oct. 1997 (retrieved Aug. 29, 2003). Retrieved from the Internet: <URL: http://www.microsoft.com/msj/1097/winnt.aspx.

(Continued)

*Primary Examiner* — Kim Vu
*Assistant Examiner* — Randal Moran
(74) *Attorney, Agent, or Firm* — Fenwick & West LLP

(57) ABSTRACT

A registry access manager (101) regulates access to executable class registry entities (103). A registry access manager (101) intercepts system calls (107) that access a registry (113). The registry access manager (101) detects attempts by processes (115) to access executable path entities (103) in the registry (113). The registry access manager (101) determines whether a robust, multifaceted security policy permits the attempted access, and blocks or permits the access accordingly.

20 Claims, 2 Drawing Sheets

U.S. PATENT DOCUMENTS

| | | | |
|---|---|---|---|
| 6,480,962 B1* | 11/2002 | Touboul | 726/22 |
| 2003/0023774 A1* | 1/2003 | Gladstone et al. | 709/328 |
| 2003/0159070 A1* | 8/2003 | Mayer et al. | 713/201 |
| 2004/0199763 A1* | 10/2004 | Freund | 713/154 |
| 2006/0090193 A1* | 4/2006 | Johnson et al. | 726/1 |
| 2006/0156380 A1* | 7/2006 | Gladstone et al. | 726/1 |

FOREIGN PATENT DOCUMENTS

| | | | |
|---|---|---|---|
| WO | WO 93/25024 A1 | 12/1993 |
| WO | WO 95/15522 A1 | 6/1995 |
| WO | WO 95/22794 A1 | 8/1995 |

OTHER PUBLICATIONS

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Macnamra, John E., "Technical Aspects of Data Communication", 2ed. 1982, Digital Equipment Corporation, U.S.A. pp. 110-122.

Ore, Oystein, "Number Theory and its History", 1976 Gudron Ore, U.S.A. pp. 124-129.

Schneier, Bruce, "Applied Cryptography", 2ed. 1996, Bruce Schneier, U.S.A. pp. 436-441.

Nair, et al., "A Symbol Based Algorithm for Hardware Implementation of Cycle Redundancy Check", IEEE, 1997.

"PC Medic 97 User's Guide", McAfee Associates, Inc., issued Mar. 1997, pp. 1-66.

"Norton Utilities for Windows User's Guide—Version 2.0", Symantec, 1995.

* cited by examiner

ROBUSTLY REGULATING ACCESS TO EXECUTABLE CLASS REGISTRY ENTRIES

TECHNICAL FIELD

This invention pertains generally to computer security, and more specifically to regulating access to executable class registry entities.

BACKGROUND ART

Networked computers are vulnerable to malicious computer code attacks, such as worms, viruses and Trojan horses. As used herein, "malicious computer code" is any code that enters a computer without an authorized user's knowledge and/or without an authorized user's consent.

A majority of malicious code today is targeted at computers running the Microsoft Windows® operating system, because of its market prevalence. Therefore, it is important to identify and patch security vulnerabilities in Windows®. One important security vulnerability today is the vulnerability of the registry database. The information stored in the registry database is of two primary classes: the parameter field class, which defines certain data values, and the executable entity path class, the entries of which refer to names of executable entities.

Malicious code such as computer viruses and computer worms use executable path entities to inject themselves into the Windows® system environment. For example, malicious code can append a value to the registry database "Run" entity, such that a malicious executable will be loaded by Windows® on start-up. Malicious code can also replace the name of one of the well-known COM objects or system DLLs with the name of itself or another malicious program. In such cases, the malicious code would then receive all traffic that was meant to go directly to the original COM object or system DLL. There are many other examples of executable path entities that can be used by malicious code to sabotage a Windows® system. Malicious code can even infect Windows® by reading an executable path entry from the registry, for example by reading the full path name of one of the standard system DLLs and copying itself to that location with the same name.

There are two existing mechanisms to apply an access rights policy to the registry. Under Windows NT® (and 2000, XP and 2003), all the registry database entries are Windows® securable objects. Through using the normal object security modification Windows® system services, an application can grant or block specific users access to individual registry database entries. However, this access rights system is based only on user identity. Therefore, any malicious application running with the right user privilege can gain write access to sensitive registry database entries. Furthermore, this approach also requires enumeration of all the sensitive registry database entries, each of which needs to be individually assigned a valid security descriptor. Due to the huge number of those entries, it is not practicable for system administrators to manage access rights this way.

Some third party systems such as Entercept Security Framework Solution provide a registry database security access policy by allowing the setting of access control for individual registry entries based on the requesting application, the user, or the time at which the access is requested. Although better than the security provided within Windows®, these systems still require manual enumeration of all sensitive registry database entries for which a security policy is desired. Furthermore, the security policy is still based only on a small number of factors.

What is needed are methods, systems and computer readable media for regulating access to executable class registry entities according to a flexible security policy, without requiring the enumeration of access rights for each individual registry entry.

DISCLOSURE OF INVENTION

The present invention comprises methods, systems and computer readable media for a registry access manager (101) to regulate access to executable class registry entities (103). A registry access manager (101) intercepts system calls (107) that access a registry (113). The registry access manager (101) detects attempts by processes (115) to access executable path entities (103) in the registry (113). The registry access manager (101) determines whether a robust, multi-faceted security policy permits the attempted access, and blocks or permits the access accordingly.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
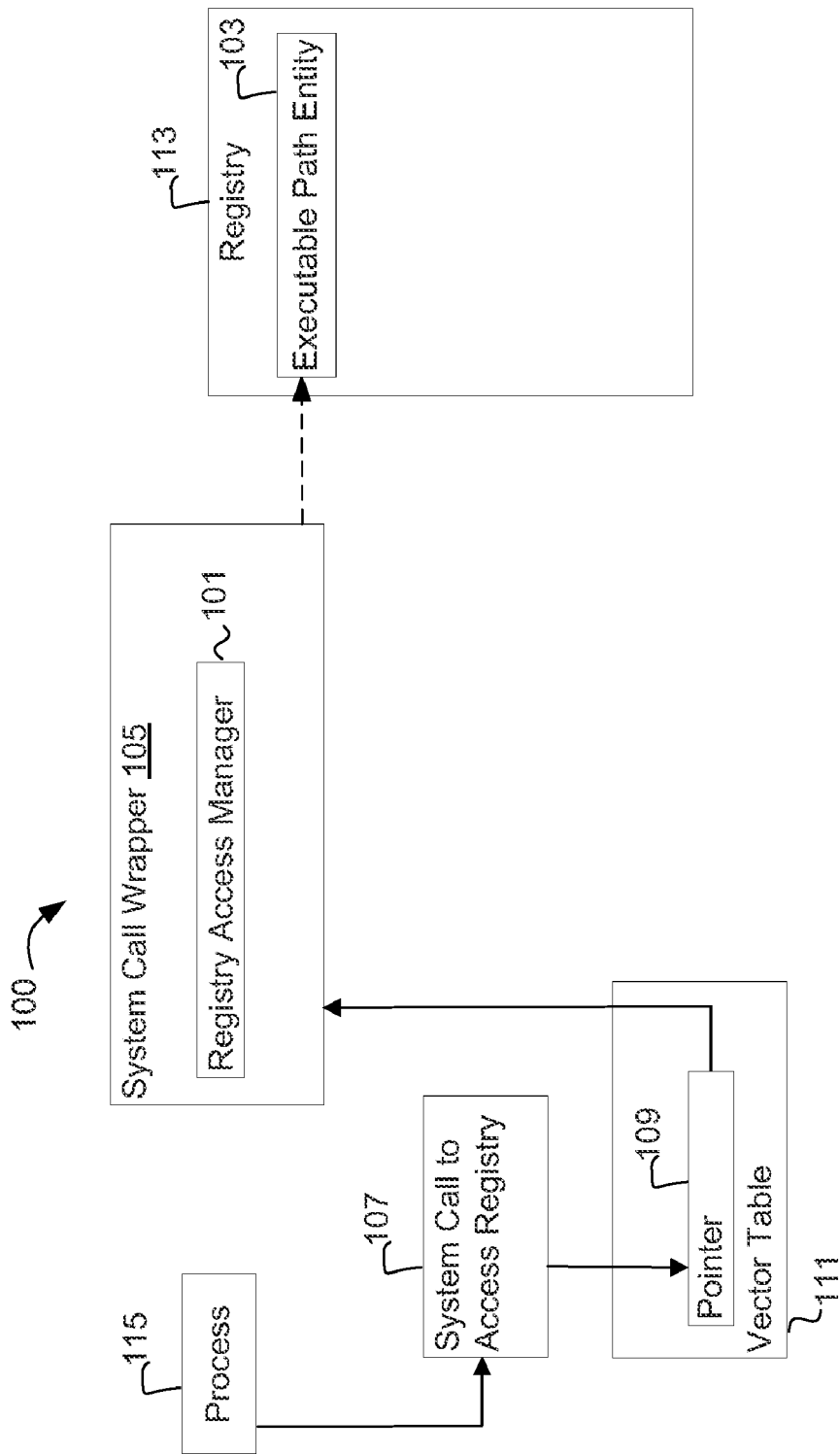
FIG. 1 is a block diagram illustrating a high level overview of a system for regulating registry access, according to some embodiments of the present invention.

FIG. 1 illustrates a high level overview of a system 100 for performing some embodiments of the present invention. A registry access manager 101 regulates access to executable path registry entities 103. It is to be understood that although the registry access manager 101 is illustrated as a single entity, as the term is used herein a registry access manager 101 refers to a collection of functionalities which can be implemented as software, hardware, firmware or any combination of the three. Where a registry access manager 101 is implemented as software, it can be implemented as a standalone program, but can also be implemented in other ways, for example as part of a larger program, as a plurality of separate programs, or as one or more statically or dynamically linked libraries.

As illustrated in FIG. 1, in some embodiments the registry access manager 101 is instantiated in the form of at least one system call wrapper 105. The implementation mechanics of intercepting system calls 107 by overwriting pointers 109 in an interrupt vector table 111 and redirecting the pointers 109 to a system call wrapper 105 are known to those of ordinary skill in the relevant art.

In such embodiments, system calls 107 that access the registry 113 are intercepted. Because the relevant system call(s) 107 are intercepted, the registry access manager 101 can monitor and control attempts to access the registry 113. In the course of such monitoring, the registry access manager 101 determines the entry type each call 107 is attempting to access, thereby detecting attempts to access executable path registry entities 103.

Where such an attempted access is detected, the registry access manager 101 determines whether the attempt is permitted according to a security policy. In various embodiments, different criteria can be utilized to determine whether the access is to be allowed or blocked. In some embodiments, access will be allowed or blocked as a function of the type of access being attempted, as well a combination of current conditions.

The attempted access type can be, for example, an attempt to add a new executable path entity 103, an attempt to read an executable path entity 103, an attempt to modify an executable path entity 103, an attempt to delete an executable path entity 103, an attempt to overwrite an executable path entity 103 (performing a delete followed by an add, in a single operation), an attempt to set object information concerning an executable path entity 103 or an attempt to query object information concerning an executable path entity 103.

In some embodiments, the security policy specifies whether the attempted access type is permitted under a combination of current conditions, including, for example, the specific executable path entity 103 which is the target of the access attempt, the executable path entity's 103 type (e.g., dynamic link library, COM object, etc.), the executable path entity's 103 name, the executable path entity's 103 contents, the new name the intercepted system call 107 is attempting to give the executable path entity 103, new content that the intercepted call 107 is attempting to write to the executable path entity 103, the current time, the current date, the process 115 that made the intercepted system call 107, the process 115 type (e.g., system, application), the user who owns the process 115 and/or a group with which the user who owns the process 115 is associated.

Thus, very specific security policies can be designed, specifying which types of accesses are permitted or not under which combinations of current conditions, as desired. For example, current conditions specified in security policies can be either defined values (e.g., name of executable path entity 103 equals "program1.dll") or wild cards (e.g., name of executable path entity 103 equals *.dll, p*.dll or program-?.dll). The use of wild cards makes the system very flexible. For example, the use of wild card * for the process 115 name condition would mean that all processes 115 are to be treated the same way, according to the specific rule in the security policy containing the wild card (e.g., when in combination with other specified conditions, all processes 115 would be granted or denied a specific type of access).

Note that the security policy can reference executable entity paths 103 by name (e.g., "system.exe,"*.exe," etc.) or by content (the actual file located pointed to by the full path name in the executable entity path 103).

When a rule in the security policy references an executable entity path 103 by content, the registry access manager 101 examines the actual contents of the file pointed to by the executable entity path 103. For example, if a rule in the security policy specifies *.dll by content, the registry access manager 101 will not merely look at the name of the target executable entity path 103, but instead examine the contents of the file pointed to thereby to determine whether that file is a dynamic link library. This is a more robust security measure than simply looking at the name, because malicious code can overwrite the corresponding file with a malicious program, renamed to mimic a trusted one.

The implementation mechanics of examining a file to determine whether it is of a well-know executable file format are known to those of ordinary skill in the relevant art. For example, the registry access manager 101 can parse the target file using known file format decoding functionality, to determine whether the file structure matches that of a specific well known executable format, such as a dynamic link library, a COM object, OCX, a device driver, a visual basic script, XML, html, java script, Windows templates script, etc.

Security policies can be defined either at host level or at a network level. A host based security policy will be used to regulate registry access operations performed on a single host computer. A network based security policy can define generic rules that are applied across different network segments, to more than one host computer. At a network level, the computer from which the access attempt originated can be another condition taken into account in a security policy. Individual computers on the network can be identified by IP address, by NETBIOS computer name or by any other naming convention used to name host computers within the network.

The use of date and/or time in security policy rules is very useful. Users, host computers, applications, etc, can be granted desired types of access only during certain date and time intervals. In addition, types of access can be blocked only during specific date and/or time intervals.

With the flexible security policies outlined above, defined rules can construct a black list of users, black list of applications, black list of host computers, etc., that are not granted certain or all types of access. Similarly, defined rules can construct white lists.

Thus, the registry access manager 101 monitors attempts to access executable path entities 103 in the registry 113, and determines whether the security policy permits the attempted access. Where the security policy permits the access, the registry access manager 101 allows the attempted access to proceed. Where the security policy does not permit the access, the registry access manager 101 blocks the attempted access.

This executable path entities 103 driven approach to securing the registry 113 is more robust than other approaches. It is the names and/or actual contents of the executable path entities 103 themselves that typically cause targeting by malicious code. By utilizing these factors in the security policy, the registry access manager 101 can successfully detect and block many otherwise undetectable malicious attacks.

In some embodiments, the registry access manager 101 logs blocked and/or allowed access attempts, e.g., to a an external data store (not illustrated). These logged attempts can be used for subsequent security auditing.

In older versions of Microsoft Windows® (e.g., 3.1, 95, 98, Me), .INI files 205 are widely used to store sensitive information concerning executable entities that can be used by malicious code to infect the system. For example, under these versions of Windows® the WIN.INI and SYSTEM.INI files 205 store information concerning the shell program, device drivers, etc. More recent versions of Windows® still have support for .INI files 205 in order to be backwards compatible and provide ongoing support for 16 bits applications.

Figure 2:
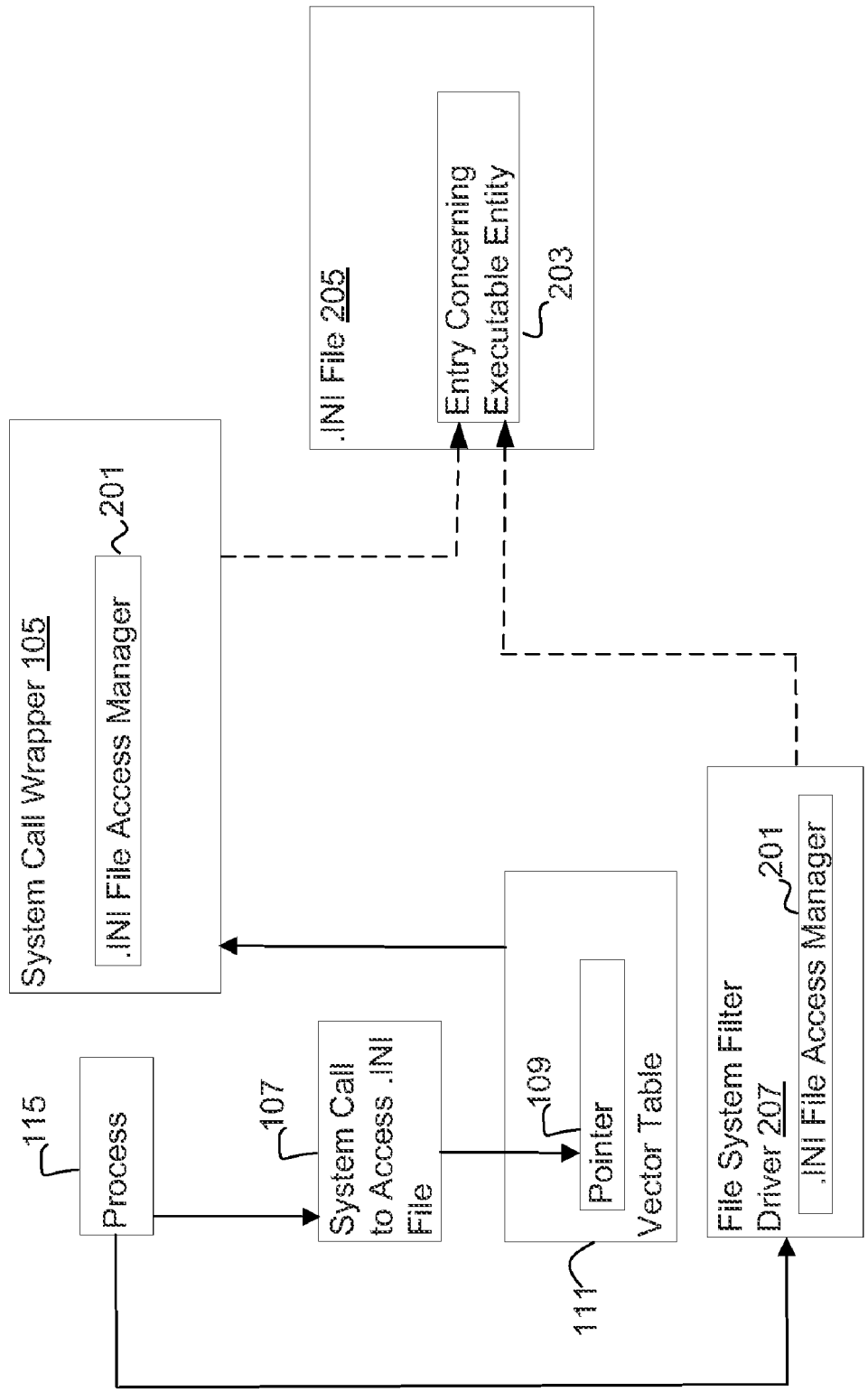
FIG. 2 is a block diagram illustrating a high level overview of a system for regulating .INI file access, according to some embodiments of the present invention.

Therefore, as illustrated in FIG. 2, in some embodiments of the present invention, an .INI file access manager 201 monitors and regulates access to entries 203 in .INI files 205 concerning executable entities. .INI files 205 are standard text files that can be accessed in one of two ways: by using Windows® services (system calls 107) for accessing .INI files 205, and by using normal file I/O operations. In embodiments that monitor access to .INI files 205, the access manager 201 typically monitors both types of access operations.

As illustrated in FIG. 2, in some embodiments a portion of the .INI file access manager 201 is instantiated within a file system filter driver 207. The implementation mechanics of file system filter drivers 207 are known to those of ordinary skill in the relevant art. Another portion of the .INI file access manager 201 is instantiated as one or more system call wrappers 105.

The portion of the .INI file access manager 201 that is instantiated within a file system filter driver 205 monitors access to the file system, and thus identifies attempted accesses of .INI file entries 203 concerning executable entities. Additionally, system calls 107 that access .INI files 205 are intercepted, and the portion of the .INI file access manager 201 instantiated as one or more system call wrappers 105 identifies attempted accesses of .INI files 205 entries 203 concerning executable entities made that way. The .INI file access manager 201 then proceeds to allow or block attempted accesses according to a security policy, as described above in conjunction with FIG. 1.

In another embodiment, the entire .INI file access manager 201 is instantiated as one or more system call wrappers 105 (not illustrated). In that embodiment, Windows services that access .INI files 205 and standard file system I/O system calls 107 are intercepted, and the .INI file access manager 201 identifies all attempted accesses of .INI file entries 203 concerning executable entities. The .INI file access manager 201 then proceeds to allow or block attempted accesses according to the security policy, as desired.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for robustly regulating access to executable path registry entities, the method comprising the steps of:

a registry access manager intercepting system calls that access a registry;

the registry access manager detecting an attempt by a process to access an executable path entity in the registry;

the registry access manager determining whether a security policy permits the access, the determining comprising examining contents of a file pointed to by the executable path entity; and the registry access manager performing a step from a group of steps consisting of:
   responsive to determining that the security policy permits the access, allowing the attempt to proceed; and
   responsive to determining that the security policy does not permit the access, blocking the attempt.

2. The method of claim 1 wherein:
   the registry access manager is instantiated as at least one system call wrapper.

3. The method of claim 1 wherein the attempt by the process to access an executable path entity in the registry comprises an attempt to perform an access of a type from a group of access types consisting of:
   adding a new executable path entity;
   reading an executable path entity;
   modifying an executable path entity;
   deleting an executable path entity;
   overwriting an executable path entity;
   setting object information concerning an executable path entity; and
   querying object information concerning an executable path entity.

4. The method of claim 1, wherein the registry access manager determining whether the security policy permits the access further comprises evaluating a condition from a group of conditions consisting of:
   the executable path entity;
   the executable path entity's type;
   the executable path entity's name;
   the executable path entity's contents;
   a new name the access is attempting to give the executable path entity;
   new content the access is attempting to write to the executable path entity;
   a current time;
   a current date;
   the process;
   the process type;
   a user who owns the process;
   a group with which the user who owns the process is associated; and
   a computer from which the access attempt originated.

5. The method of claim 1 wherein the registry access manager blocks the attempt, the method further comprising the step of:
   the registry access manager logging the blocked attempt.

6. The method of claim 1 wherein the registry access manager allows the attempt to proceed, the method further comprising the step of:
   the registry access manager logging the allowed access operation.

7. The method of claim 1 wherein the security policy is host based.

8. The method of claim 1 wherein the security policy is network based.

9. The method of claim 1, further comprising the registry access manager determining, based on the contents of the pointed-to file, whether the pointed-to file matches a type specified in the security policy.

10. A computer implemented method for robustly regulating access to entries in .INI files concerning executable entities, the method comprising the steps of:
- an .INI file access manager detecting an attempt by a process to access an entry in an .INI file concerning an executable entity;
- the .INI file access manager determining whether a security policy permits the access, the determining comprising examining contents of a file pointed to by the entry concerning the executable entity; and
- the .INI file access manager performing a step from a group of steps consisting of:
  - responsive to determining that the security policy permits the access, allowing the attempt to proceed; and
  - responsive to determining that the security policy does not permit the access, blocking the attempt.

11. The method of claim 10 wherein:
the .INI file access manager is instantiated as at least one system call wrapper.

12. The method of claim 10 wherein:
a portion of the .INI file access manager is instantiated as a file system filter driver and a portion of the .INI file access manager is instantiated as at least one system call wrapper.

13. The method of claim 10 wherein the attempt by the process to access an entry in the .INI file concerning an executable entity comprises an attempt to perform an access of a type from a group of access types consisting of:
- adding a new entry concerning an executable entity;
- reading an entry concerning an executable entity;
- modifying an entry concerning an executable entity;
- deleting an entry concerning an executable entity; and
- overwriting an entry concerning an executable entity.

14. The method of claim 10, wherein the .INI file access manager determining whether the security policy permits the access further comprises evaluating a condition from a group of conditions consisting of:
- the entry concerning an executable entity;
- the entry concerning an executable entity's type;
- the entry concerning an executable entity's name;
- the entry concerning an executable entity's contents;
- a new name the access is attempting to give the entry concerning an executable entity;
- new content the access is attempting to write to the entry concerning an executable entity;
- a current time;
- a current date;
- the process;
- the process type;
- a user who owns the process;
- a group with which the user who owns the process is associated; and
- a computer from which the access attempt originated.

15. The method of claim 10 wherein the security policy is host based.

16. The method of claim 10 wherein the security policy is network based.

17. The method of claim 10, further comprising the .INI file access manager determining, based on the contents of the pointed-to file, whether the pointed-to file matches a type specified in the security policy.

18. A non-transitory computer readable medium containing a computer program product for robustly regulating access to executable path registry entities, the computer program product comprising:
- program code for intercepting system calls that access a registry;
- program code for detecting an attempt by a process to access an executable path entity in the registry;
- program code for determining whether a security policy permits the access, the determining comprising examining contents of a file pointed to by the executable path entity; and
- program code for performing a step from a group of steps consisting of:
  - responsive to determining that the security policy permits the access, allowing the attempt to proceed; and
  - responsive to determining that the security policy does not permit the access, blocking the attempt.

19. A non-transitory computer readable medium containing a computer program product for robustly regulating access to entries in .INI files concerning executable entities, the computer program product comprising:
- program code for detecting an attempt by a process to access an entry in an .INI file concerning an executable entity;
- program code for determining whether a security policy permits the access, the determining comprising examining contents of a file pointed to by the entry concerning the executable path entity; and
- program code for performing a step from a group of steps consisting of:
  - responsive to determining that the security policy permits the access, allowing the attempt to proceed; and
  - responsive to determining that the security policy does not permit the access, blocking the attempt.

20. A computer system for robustly regulating access to executable path registry entities, the computer system having a memory and comprising:
- a software portion stored in the memory and configured to intercept system calls that access a registry;
- a software portion stored in the memory and configured to detect an attempt by a process to access an executable path entity in the registry;
- a software portion stored in the memory and configured to determine whether a security policy permits the access, the determining comprising examining contents of a file pointed to by the executable path entity; and
- a software portion stored in the memory and configured to perform a step from a group of steps consisting of:
  - responsive to determining that the security policy permits the access, allowing the attempt to proceed; and
  - responsive to determining that the security policy does not permit the access, blocking the attempt.

* * * * *